(12) United States Patent
Christmann et al.

(10) Patent No.: US 12,240,663 B2
(45) Date of Patent: Mar. 4, 2025

(54) CLOSURE

(71) Applicant: IRISgo AG, Horw (CH)

(72) Inventors: Fabian Christmann, Gelterkinden (CH); Manuel Laurice Borer, Diepflingen (CH); Daniel Christian Fässler, Ibach (CH); Oliver Philippe Feusi, Brienz (CH)

(73) Assignee: IRISgo AG, Horw (CH)

( * ) Notice: Subject to any disclaimer, the term of this patent is extended or adjusted under 35 U.S.C. 154(b) by 113 days.

(21) Appl. No.: 17/910,121

(22) PCT Filed: Mar. 19, 2021

(86) PCT No.: PCT/EP2021/057059
§ 371 (c)(1),
(2) Date: Sep. 8, 2022

(87) PCT Pub. No.: WO2021/186018
PCT Pub. Date: Sep. 23, 2021

(65) Prior Publication Data
US 2023/0312192 A1 Oct. 5, 2023

(30) Foreign Application Priority Data
Mar. 19, 2020 (CH) .................................. 00327/20

(51) Int. Cl.
*B65D 47/20* (2006.01)
*A47G 19/22* (2006.01)
(Continued)

(52) U.S. Cl.
CPC ..... *B65D 47/2037* (2013.01); *A47G 19/2266* (2013.01); *B65D 41/0492* (2013.01);
(Continued)

(58) Field of Classification Search
CPC ................ B65D 47/32; B65D 47/2037; B65D 47/2031; B65D 47/2018; B65D 45/32;
(Continued)

(56) References Cited

U.S. PATENT DOCUMENTS

| 2005/0082248 A1 | 4/2005 | Al-Jadda et al. |
| 2015/0034650 A1 | 2/2015 | Frolin |

(Continued)

FOREIGN PATENT DOCUMENTS

TW M586247 U 11/2019

OTHER PUBLICATIONS

International Search Report for PCT/EP2021/057059 mailed Jun. 9, 2021.

*Primary Examiner* — Robert J Hicks
(74) *Attorney, Agent, or Firm* — GrowIP Law Group LLC (57) ABSTRACT

A closure for a container is disclosed, including a ring-shaped base element extending around a longitudinal axis and including a first through opening, a ring-shaped rotary element, which can be operatively connected to the base element and can be rotated relative thereto about the longitudinal axis, and at least one closing element. The closing element comprises a first and a second end wherein the first end of the closing element being operatively connected to the base element and the second end of the closing element being operatively connected to the rotary element, and wherein the closing element at least partially closing a closure opening in a rotated state of the rotary element relative to the base element.

16 Claims, 7 Drawing Sheets

(51) Int. Cl.
  *B65D 41/04* (2006.01)
  *B65D 47/32* (2006.01)
  *F16K 7/08* (2006.01)

(52) U.S. Cl.
  CPC ............... *B65D 47/32* (2013.01); *F16K 7/08* (2013.01); *B65D 2205/00* (2013.01)

(58) Field of Classification Search
  CPC .... B65D 45/00; B65D 41/0492; B65D 41/04; B65D 43/20; B65D 43/12; B65D 2205/00; A47G 19/2266
  USPC ................... 220/350, 345.1, 345.4, 319, 315
  See application file for complete search history.

(56) References Cited

U.S. PATENT DOCUMENTS

| | | |
|---|---|---|
| 2016/0207672 A1 | 7/2016 | Wong |
| 2020/0087041 A1* | 3/2020 | Jang ................. B01F 23/23611 |

* cited by examiner

CLOSURE

CROSS-REFERENCE TO RELATED APPLICATIONS

This application is a U.S. National Stage Application of International PCT Application No. PCT/EP2021/057059, filed on Mar. 19, 2021, that claims priority to Swiss Application No. CH00327/20, filed on Mar. 19, 2020, which are all hereby incorporated by reference in their entirety.

TECHNICAL FIELD

The present disclosure is in the field of closures for a container, in particular for a container for liquids.

BACKGROUND

Various closures are known from the prior art. Many of these closures are disposable closures, which can be disposed of after, for example, the consumption of a beverage or the consumption of some other liquid. There are also closures which serve for repeated use.

An example of a known closure for repeated use is EP2825478A1, published on 21 Jan. 2015 on behalf of Neolid. This document discloses a container for foodstuffs having a rotatably movable ring. The ring can be moved between a release position of a container opening and a closure position of this container opening. A membrane made of an elastic material, which is connected, on the one hand, to the container and, on the other hand, to the ring, can be twisted between the release position and the closure position by rotating the ring. In order to prevent the twisted membrane from snapping back, the container has a spur and a multiplicity of notches, wherein the spur is capable of engaging in one of the notches and securing the container in the closure position.

A disadvantage of the prior art is the relatively complex structure, which is difficult to clean and assemble.

SUMMARY

It is an object of the disclosure to provide a mechanically stable closure for a container.

A closure according to the disclosure is used to open and close a container, in particular for liquids. The closure includes a ring-shaped base element extending around a longitudinal axis and a ring-shaped rotary element, which can be operatively connected thereto. The rotary element is rotatable relative to the base element about the longitudinal axis. In particular, the rotary element can be rotated between an open state and a closed state of the closure. The base element further includes a first through opening in the direction of the longitudinal axis, and the rotary element includes a second through opening in the direction of the longitudinal axis. Advantageously, the longitudinal axis extends centrally through the first and/or second through opening. I.e, the first and the second through opening can be coaxially arranged with one another. The base element can be separately configured and can be operatively connected to the container. For good handling, the base element can be arranged within a contour of the container in the direction of the longitudinal axis. In another possibility, the base element can also be configured integrally with the container. In this case, the base element is to be understood as a region of the container which is arranged in the vicinity of and around a container opening.

For opening and closing the closure, it includes at least one closing element having a first and a second end. In this arrangement, the first end of the closing element is operatively connected to the base element and the second end to the rotary element. A closure opening of the closure is defined by the at least one closing element, as will be described in more detail below. The closure opening is radially constricted or opened by a displacement of the second end in relation to the first end (caused by the rotation of the rotary element relative to the base element). A movable region of the closing element is arranged between the first and second end of the closing element, respectively the movable region is delimited by the first and second end. The movable region is advantageously arranged inside, in particular completely inside, the first and/or the second through opening, with the result that the closing element is arranged inside the closure. As a result, the closure is mechanically more stable and the closing element is better protected from external influences.

When the rotary element is rotated relative to the base element between the open and the closed state, the cross section of the closure opening changes. For example, the closing element can constrict the closure opening in a first direction of rotation of the rotary element relative to the base element (reduction of the cross section of the closure opening) and open it again in an opposite, second direction of rotation (enlargement of the cross section of the closure opening). If the rotary element is sufficiently rotated relative to the base element, the closed state of the closure, or of the closure opening, can be achieved (in which the cross section of the closure opening is zero). Advantageously, the closure opening is closed when the rotary element is rotated by at least 180° relative to the base element. Advantageously, the closed closure opening is closed in a liquid-tight manner.

Depending on the configuration of the closure, the rotary element can be held against the base element in a self-inhibiting manner in the closed state. Self-inhibiting is intended to mean that the rotary element and the base element are secured from turning back or snapping back by a resistance caused by friction. I.e. a restoring force which acts on the rotary element in the opposite direction to the rotation is smaller than the resistance between the rotary element and the base element caused by the friction. Because of the self-inhibiting effect, a locking device and/or a form fit can be dispensed with, which significantly simplifies the mechanism of the closure and increases the wear and the service life of the closure. The restoring force caused by the rotated closing element decreases when the rotary element is rotated by more than 180° relative to the base element, with the result that the closure holds best when the rotary element is rotated by more than 180°. I.e. in the closed state of the closure, the rotary element is therefore advantageously rotated by more than 180° with respect to the base element.

Depending on the configuration, the rotary element can additionally be arranged with respect to the base element so as to be displaceable in the direction of the longitudinal axis. Advantageously, the rotary element is spaced further apart from the base element in the open state of the closure than in the closed state. I.e, the first and the second end of the closing element are spaced further apart from one another in the direction of the longitudinal axis in the open state of the closure than in the closed state. This displacement can be supported by guide means. In this case, the rotary element can comprise first guide means and/or the base element can comprise second guide means for guiding the rotary element. The first guide means can be, for example, a thread extending in the second lead-through opening of the rotary element. The second guide means (for example in the form of a T-slide, a further thread or the like) can be guided in the first guide means. The second guide means is advantageously arranged on an outer side of the base element. For simple handling of the closure, the second guide means can additionally comprise at least one stop for the first guide means in the direction of the longitudinal axis. Advantageously, however, there are two stops in the direction of the longitudinal axis, between which the first guide means is arranged. The stops can prevent the rotary element from being detachable from the base element when it is rotated in the axial direction. Furthermore, the second guide means can additionally be fixable in an end position on the at least one stop. For example, the second guide means can be clampable between the stop and the first guide means.

Depending on the use of the closure, the latter can include a ring-shaped mouthpiece, at which a user can easily drink a liquid from the container. A mouthpiece has the advantage that the user has no contact with the membrane. The mouthpiece can at least in some region or regions have a liquid-repellent coating. The mouthpiece can be operatively connected to the rotary element or the base element. In an assembled state of the mouthpiece, the rotary element can be arranged radially inside the mouthpiece. Alternatively, the mouthpiece can be configured integrally with the base element and/or the container. For good handling, the mouthpiece can be arranged within a contour of the container in the direction of the longitudinal axis.

In a preferred embodiment, the closing element is a membrane. The membrane advantageously extends in the form of a tube from a first end to a second end in the direction of the longitudinal axis. The movable region of the membrane delimited by the first and second ends can be twisted (elastically) by the rotary movement of the rotary element. In the case where the closing element is a membrane, the closure opening is defined by the latter. I.e, the membrane, in particular the movable region of the membrane, forms the closure opening in the direction of the longitudinal axis. The closure opening extends in the direction of the longitudinal axis and can be delimited in the radial direction by an inner side of the membrane. The respective ends of the membrane are used to fasten the membrane. The first and second ends can each be ring-shaped configured regions of the membrane. The first and/or second end can be connected to the base element and/or the rotary element in a force-locking and/or form fitting manner. Advantageously, this connection is liquid-tight. There can be at least one pressing ring for fastening the membrane. The first end can thus be held between the rotary element and the pressing ring. Alternatively or in addition, the second end can likewise be held between the base element and a further pressing ring. It is also conceivable, for example, for the second end of the membrane to be clamped between the rotary element and a mouthpiece which is operatively connected to the rotary element. The first and/or the second end of the membrane can additionally have a thickened portion. Advantageously, the thickened portion is ring-shaped. The thickened portion can have a round cross section, for example. On the one hand, the thickened portion can serve to better fasten the ends. Alternatively or in addition, the thickened portion can serve as a seal.

Advantageously, the membrane is elastically deformable. In the open state of the closure, the membrane is advantageously mounted pretensioned in the direction of the longitudinal axis, i.e. elastically deformed. In this tensioned state of the membrane and the open state of the closure, the membrane is thus smoothed out and does not form any folds. In this way, a large closure opening with a smooth inner wall is formed. By means of the above-described axial displacement of the rotary element relative to the base element, this pretension for closing the closure can be released, if the rotary element is spaced apart less from the base element in the closed state of the closure than in the (pretensioned) open state. I.e, the length of the movable (twistable) region of the membrane in the axial direction decreases when the rotary element is rotated from the open state into the closed state of the closure. In an embodiment of the first guide means as a thread, the axial displacement of the rotary element relative to the base element during closure can be achieved by the thread pitch. For good handling with respect to the force to be applied to close the closure, a ratio of $L/D=0.3$-$0.7$, in particular $L/D=0.45$-$0.55$, can be selected. In this case, L is the length of the movable (twistable) region of the membrane in the open state of the closure in the direction of the longitudinal axis, and D is the diameter of the (untwisted) movable region of the membrane in the open state. All elastomers are suitable materials for the membrane. In particular, compounds of rubber, latex, but also butyl, polyurethane, polyisoprene or polyhydroxybutyrate (PHB). These lists are not exhaustive. However, silicone is particularly advantageous. For ease of use, it may be advantageous if the membrane has an anti-adhesion coating on at least one side. Alternatively or in addition, the membrane can have a thermally insulating coating on at least one side.

Depending on the configuration of the closure, the latter can comprise at least one ventilation channel for pressure equalization of a membrane interspace. The membrane interspace is arranged between the membrane and the rotary element and/or between the membrane and the base element. In a rotated state of the rotary element relative to the base element, the volume of the membrane interspace is generally increased, which may cause a pressure drop in the membrane interspace. The pressure drop can lead to the membrane deforming in such a way that it adheres to itself and closing of the closure is made more difficult. In order to avoid this effect, the closure can comprise at least one ventilation channel, which connects the membrane interspace to the environment of the closure in such a way that pressure equalization is possible. The (at least one) ventilation channel can extend from a first opening on an outer side of the closure to a second opening, which is arranged in the membrane interspace. Advantageously, the ventilation channel extends between the base element and the rotary element. The ventilation channel can be configured, for example, as a gap between the base element and the rotary element. If guide means are present, such as, for example, a thread as described above, the first and/or the second guide means can be interrupted over the circumference by the at least one ventilation channel.

In a further possible embodiment according to the disclosure, the closure includes at least one closing element in the form of a cord. Good results can be achieved with three cords. The at least one cord can be fastened at a first end to a base element and at a second end to the rotary element. In the case of a plurality of cords, these are advantageously evenly distributed around the longitudinal axis. The cords define a closure opening arranged between the cords. I.e, the cross section of the closure opening can be changed by a movement of the cords. If only one cord is present, it surrounds the closure opening. As a result of the rotary movement of the rotary element, the second end of the at least one cord is displaced in such a way that the closure opening is constricted and its cross section is reduced. The constriction can be reversed by a corresponding counter-movement. In the case of three cords, these can initially span an angle of rotation of approximately α=1000 of the closure and can be rotated through a further 100° when the rotary element is rotated, with the result that they finally span over 200° and constrict the closure opening. The cords advantageously have a high abrasion resistance and an elasticity similar to a fishing line or lower. A suitable modulus of elasticity of the cords is between 0.01 and 4 GPa (1 GPa=109 N/m2). Plastics or plastic compounds are also suitable, in particular elastomers, elastane, polyester, polyamide, but rubber or silicone compounds, fullerenes, metals, wool, silk, cotton, artificial silk or viscose.

In order to close the closure (in a liquid-tight manner), a sleeve can be provided in this embodiment (with at least one cord) which can be constricted by the at least one cord as a result of the rotary movement. By means of the corresponding counter-movement of the rotary element, the constriction of the sleeve is correspondingly reversed. The rotary movement has the effect that the sleeve is radially constricted and finally, with sufficient rotation, pinches off the closure opening. The sleeve is thus elastically deformable. The sleeve can be arranged with its first and second edges on the base element in each case. Advantageously, the sleeve extends in the form of a tube from a first edge to a second edge in the direction of the longitudinal axis. The at least one cord is advantageously arranged radially outside the sleeve and between the edges of the sleeve in the direction of the longitudinal axis. In the embodiment with cords, the tubular sleeve forms the closure opening in the direction of the longitudinal axis. In this case the closure opening can be delimited in particular by an inner side of the sleeve. In a constricted state, the closure opening is advantageously closed in a liquid-tight manner. The sleeve can be made of the same material as the membrane. The coatings of the membrane can also be used in the case of the sleeve. In a non-constricted state, the sleeve can be at least in some region or regions arranged coaxially along the first and/or second through opening. Likewise, the restoring force of the elastic sleeve ensures that the at least one cord is pushed outward by the sleeve in the open state and the closure opening is thus released again.

Depending on the embodiment, the closure can include an additional operating element. The operating element can be operatively connected to the rotary element and serves to simplify the rotation of the rotary element. The operating element can be ring-shaped. Depending on the design, the rotary element can be arranged radially inside the base element (facing the longitudinal axis). In this case, the operating element can be operatively connected to the rotary element via at least one operative connection means, such as, for example, a web and/or a toothed wheel and/or toothing, through an opening of the base element. In this way, an adjustment of the operating element results in a rotation of the rotary element. A vertical movement can also be carried out on the operating element if corresponding deflections of the effective forces are provided. Advantageously, an opening is provided for each operative connection means. For example, two or more than three webs can be arranged in two or more than three openings in order to have more freedom with respect to the angle of rotation, which can change accordingly and can be up to about 170°. The at least one opening can be of slot-type design and can extend at least in some region or regions around the circumference of the base element. Furthermore, the operating element can include a handle.

Depending on the application, a locking device can additionally be provided for locking the rotary element and/or the operating element in the closed position. Such a locking device can be achieved by means of a lever or slide, a clamping device, a spring or some other common device. There are no restrictions in the choice of material, provided that the properties required for operation are ensured. These include robustness, machinability, and resistance to the expected adverse effects of heat, cold, and moisture.

The closure, as described above, can be operatively connected to a container. The container advantageously has a bottom and a tubular wall, which merges into the bottom. The wall surrounds a filling space of the container. The wall can be substantially cylindrical and/or at least conical in some region or regions. Depending on the application, the container can be double-walled, in particular vacuum-insulated. Other properties of the container, for example the ability to store heat and cold or the inclusion of an insulation or a handle, are also self-evident and will not be described further here. Metal, in particular stainless steel, is a suitable material for the container. However, the container can also be a composite material consisting of a selection of the materials natural rubber, paper, silicone, bamboo and hemp fibers, stainless steel, aluminum, wood, glass, plastic (PP, PU, PET, polystyrene, ESP, PLA), ceramics, porcelain, cardboard and artificial stone or can be produced from individual ones of these materials. If the base element and/or the rotary element and/or the mouthpiece are configured separately, they can advantageously comprise plastic, such as, for example, polypropylene.

BRIEF DESCRIPTION OF THE DRAWINGS

Aspects of the disclosure are explained in more detail with reference to the exemplary embodiments shown in the following figures and the associated description. More specifically.

DETAILED DESCRIPTION

Figure 1:
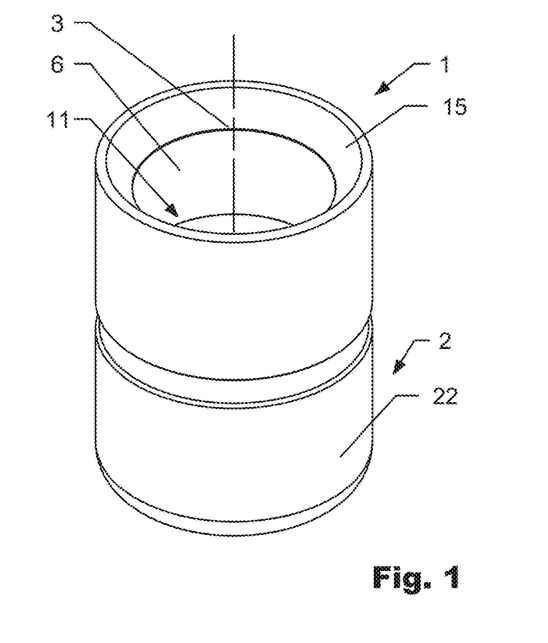
FIG. 1 shows a first variant of a closure according to the disclosure with a container in a perspective view in an open state.
Figure 2:
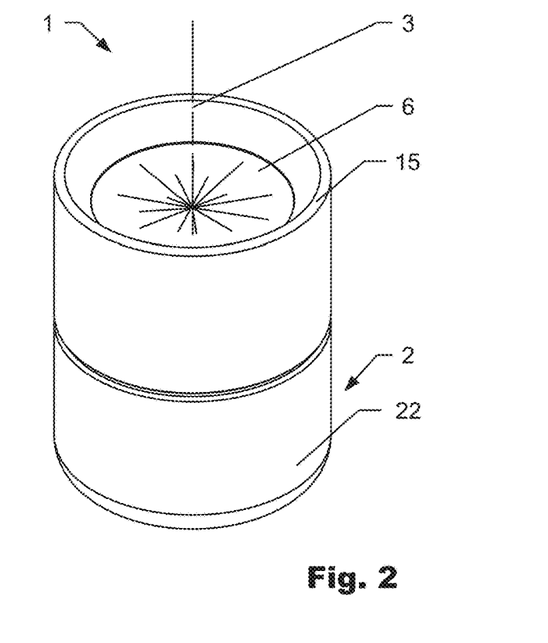
FIG. 2 shows the first variant of the closure with a container according to FIG. 1 in a perspective view in a closed state.

FIG. 1 to FIG. 4 show a first variant of a closure 1 according to the disclosure with a container 2. The container includes a wall 22 and a bottom 23. The closure 1 includes ring-shaped base element 4 extending around a longitudinal axis 3 and having a first through opening 9, a ring-shaped rotary element 5 operatively connected to the base element 4 and rotatable relative thereto about the longitudinal axis 3 and having a second through opening 10, and a closing element for closing a closure opening 11. In the example shown, the closing element is a tubular, elastic membrane 6, which forms the closure opening 11 in the direction of the longitudinal axis. In a closed state of the closure 1, the closure opening 11 is constricted (see FIG. 2). In an open state, on the other hand, the membrane 6 extends substantially along the first and/or second through opening 9, 10, as shown in FIG. 1.

Figure 3:
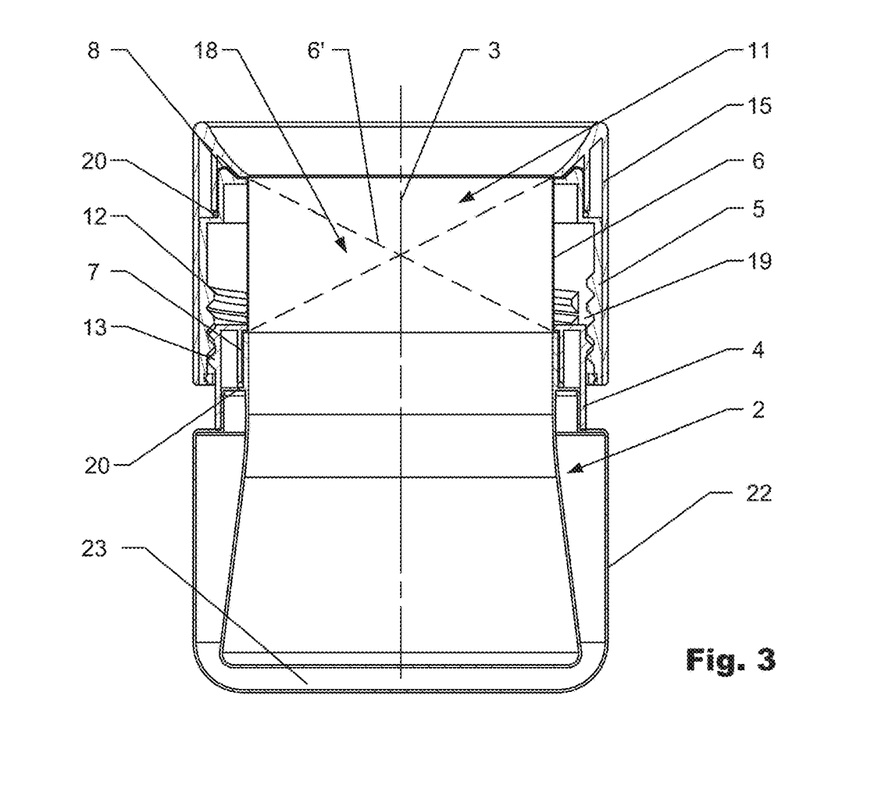
FIG. 3 shows the closure with the container according to FIG. 1 in a sectional view.

As shown in FIG. 3, the membrane 6 is operatively connected with a first end 7 to the base element 4 and with a second end 8 to the rotary element 5. When the rotary element 5 is rotated relative to the base element 4, a movable region of the membrane 6, which is delimited by the first and second ends 7, 8, is correspondingly twisted. In the example shown, the membrane 6 is clamped and/or glued by its second end 8 between the rotary element 5 and a mouthpiece 15. The first end 7 of the membrane 6 is clamped and/or glued between the base element 4 and the container 2. The first and the second end 7, 8 each have a thickened portion 20 with a sealing effect. A mouthpiece 15 is placed on the rotary element 5 and can rotate therewith in relation to the base element 4.

First guide means are arranged on the rotary element 5 in the form of a thread 12 extending around the second through opening 10 at least in some region or regions. On the outside of the base element 4, second guide means 13 in the form of multiple T-slides or a corresponding mating thread 13 are arranged, which are guided in the first guide means 12. When the rotary element 5 is rotated relative to the base element 4 from the open state into the closed state, the second guide means 13 are guided in the first guide means 12, and the rotary element 5 is moved toward the base element 4 in the direction of the longitudinal axis 3 (see FIG. 1 and FIG. 2). At the same time, the length of the movable (twistable) region of the membrane 6 in the axial direction decreases when the rotary element 5 is rotated from the open state into the closed state of the closure 1, and the movable region of the membrane 6 is elastically twisted. After a rotation of at least 180°, the closure opening 11 is closed by the membrane 6. In this state, the tension on the membrane 6 in the direction of the longitudinal axis 3 is so great that a self-inhibiting occurs between the first and second guide means 12, 13, preventing the membrane 6 from snapping back.

Figure 4:
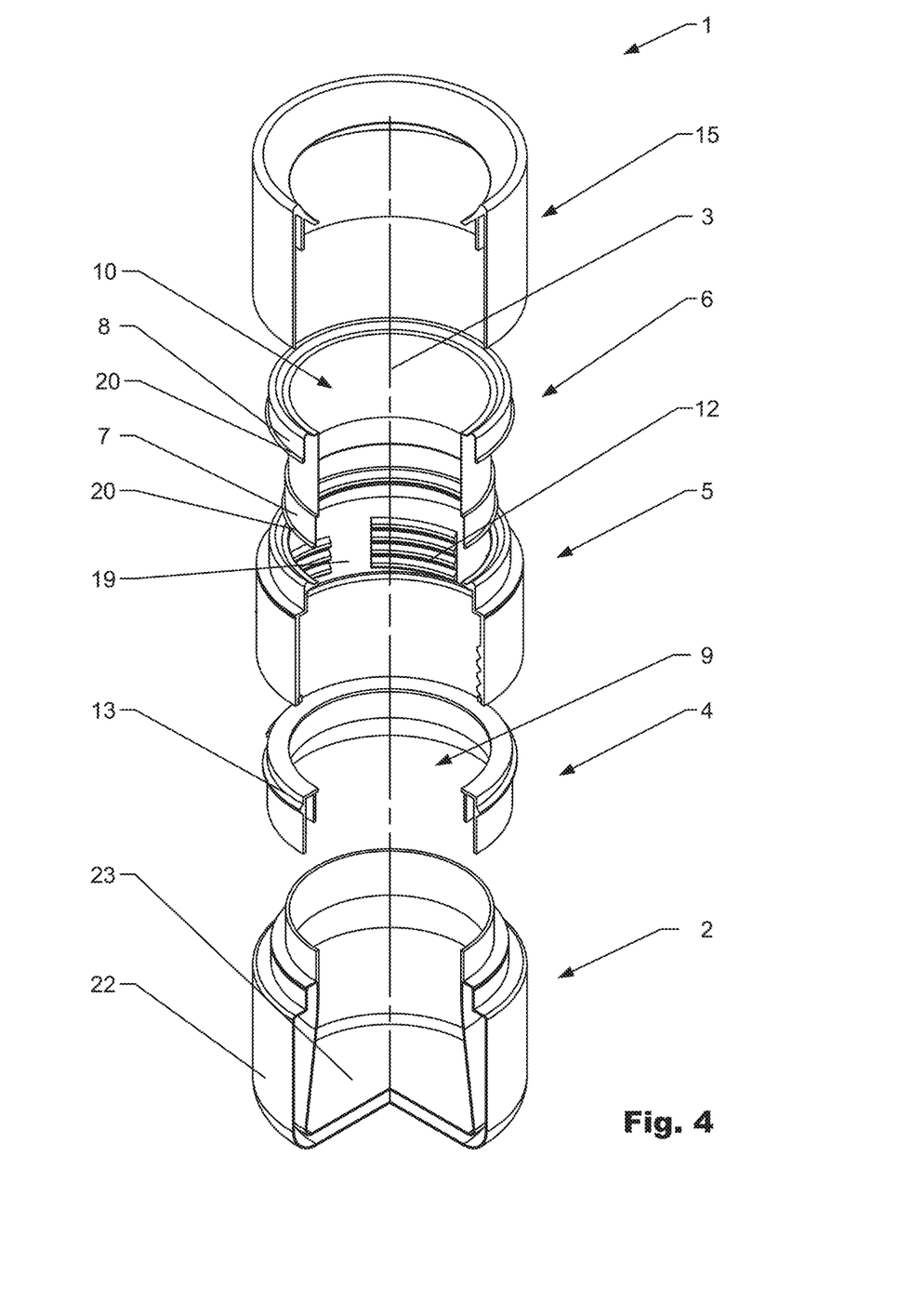
FIG. 4 shows the closure with the container according to FIG. 1 in an exploded view.

As can be seen in the exploded view in FIG. 4, the first guide means 12 are interrupted in the circumferential direction. In this case, each of the interruptions forms a ventilation channel 19. This enables pressure equalization in a membrane interspace 18 between the membrane 6 and the base element 4 and/or the rotary element 5. FIG. 3 schematically indicates the membrane interspace 18 of the elastically twisted membrane 6', the volume of which interspace has been increased.

Figure 5:
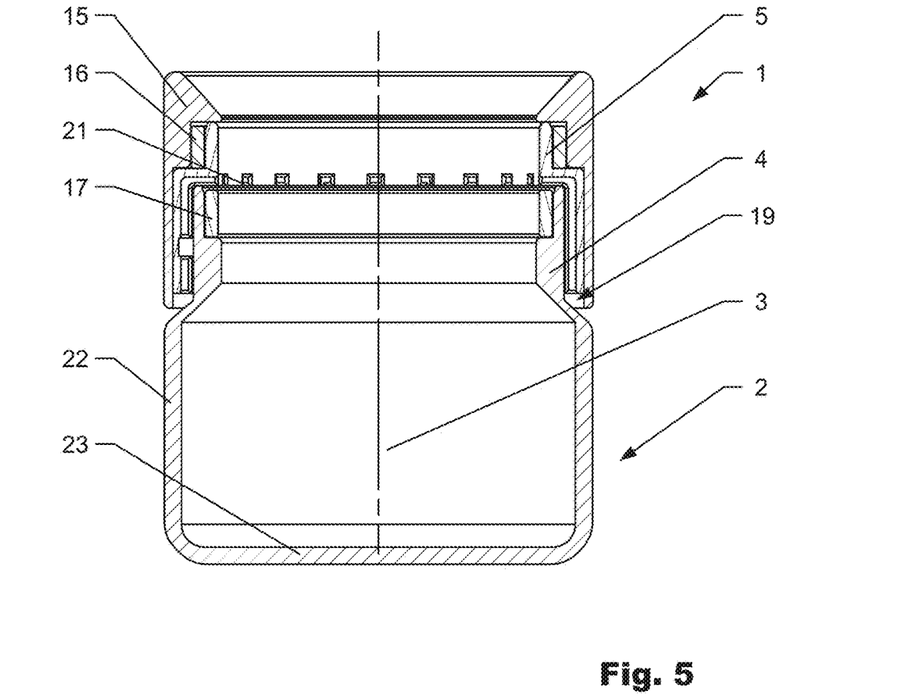
FIG. 5 shows a second variant of a closure according to the disclosure with a container in a sectional view.
Figure 6:
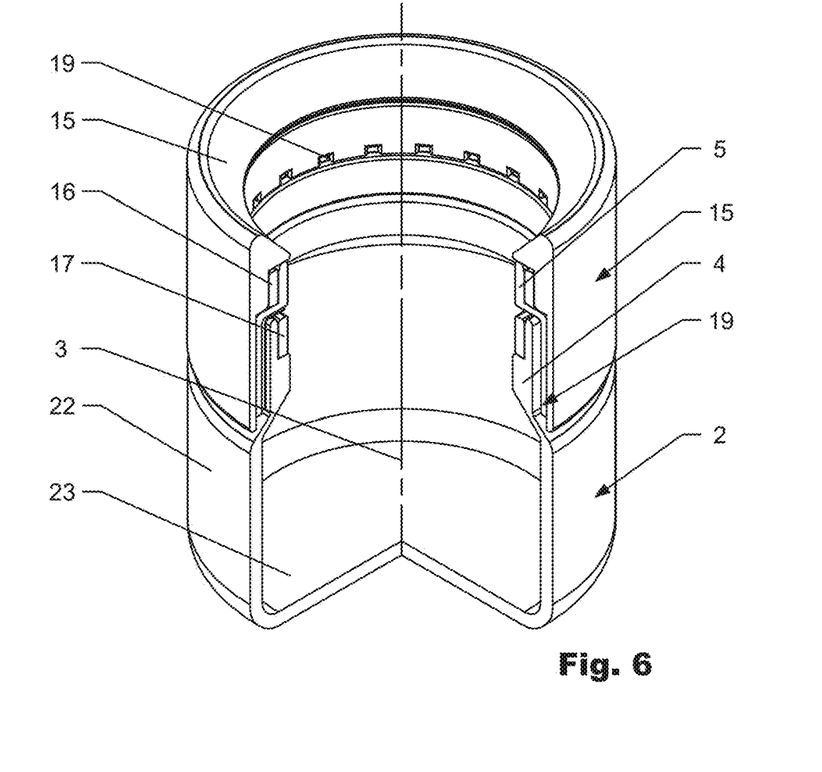
FIG. 6 shows the closure with the container according to FIG. 5 in a perspective, partial sectional view.
Figure 7A:
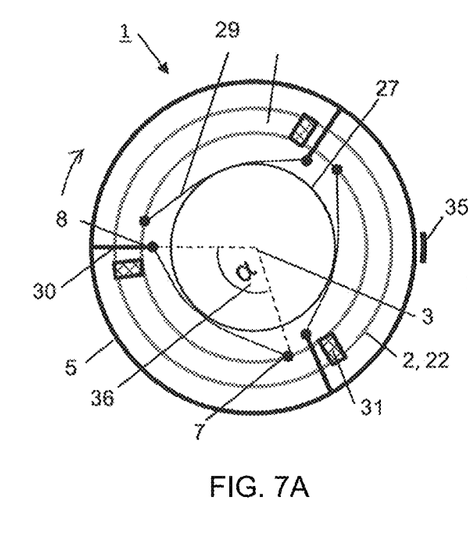
FIGS. 7A-D show a third variant of a closure according to the disclosure with a container.
Figure 7B:
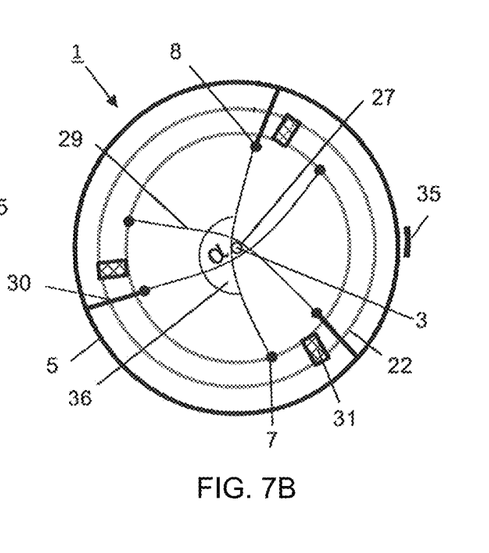
Figure 7C:
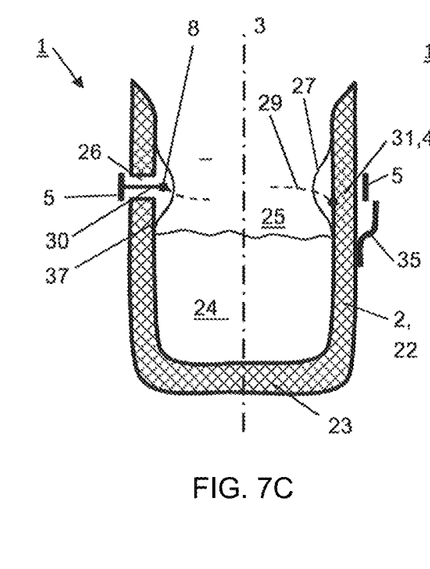
Figure 7D:
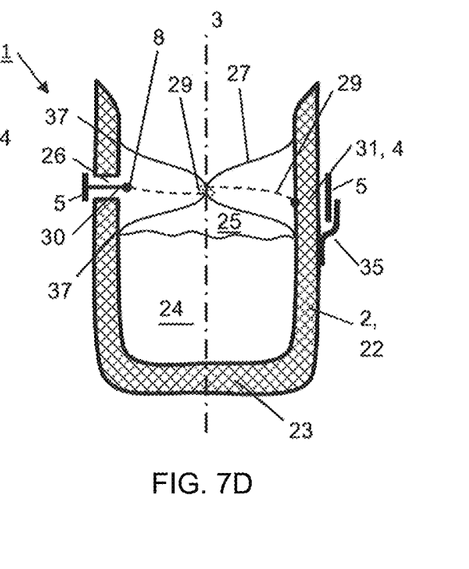
Figure 8A:
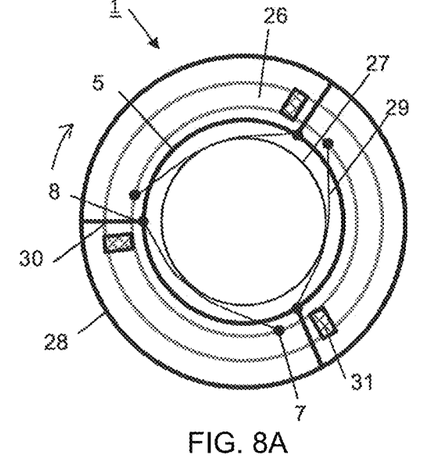
FIGS. 8A-D show a fourth variant of a closure according to the disclosure with a container.
Figure 8B:
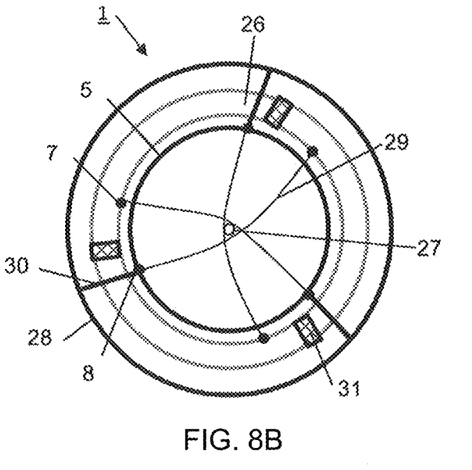
Figure 8C:
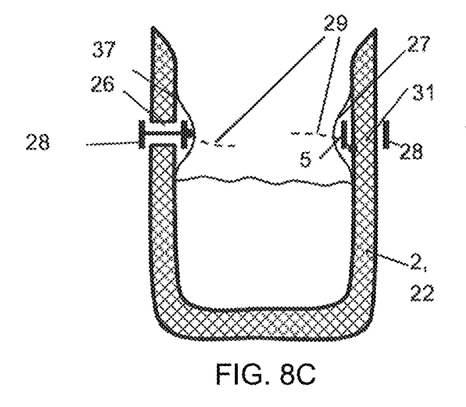
Figure 8D:
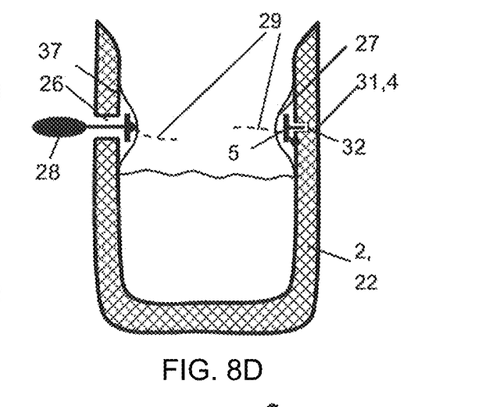

FIG. 5 and FIG. 6 show a second variant of a closure 1 according to the disclosure with a container 2. The membrane is not shown. The second variant differs from the first variant in that the base element 4 is configured integrally with the container 2. The base element is formed by an (integral) region of the container around a container opening. A first pressing ring 16 clamps the second end of the closing element, or the membrane, between the latter and the rotary element 5. A second pressing ring 17 clamps the first end of the membrane between the latter and the base element 4. A rotation of the rotary element 5 can be carried out, e.g. when the rotary element 5 is raised in the direction of the longitudinal axis 3 against the tension of the membrane. Ventilation channels 19 for the membrane interspace are also provided in this variant. FIG. 6 shows how a ventilation channel 19 in the form of a gap extends between the base element 4 and the rotary element 5. Recesses 21 in the rotary element ensure that the ventilation channel 19 is not closed.

FIG. 7A to FIG. 12D show further exemplary embodiments of a closure 1 for closing a container 2, with a closing element in the form of at least one cord 29. The at least one cord 29 defines the closure opening 11 of the closure 1, which is formed by a tubular sleeve 27. In these exemplary embodiments, the base element and the mouthpiece are integrally configured with the container. However, it is also conceivable that the base element and the mouthpiece are configured as separate components.

FIGS. 7A-D and FIGS. 8A-D show exemplary embodiments of a closure 1 for closing a container 2, in each case in longitudinal section and in cross section. The container 2 includes a wall 22 and a bottom 23, which surround a filling space 24, and has a central, vertical longitudinal axis 3. The wall 22 includes at the upper end in the region of the integral base element 4, one or more lateral, outwardly continuous openings 26. A sleeve 27 is arranged in an internal space 25 of the container 2 and is leaktightly attached by its edges 37 above and below the openings 26 to the wall 22 or to the (integral) base element 4. In the case shown, the sleeve 27 (in the open state) is arranged substantially concentrically with respect to the wall 22. In FIGS. 7A-D, the adjustable ring-shaped rotary element 5, which serves to open and close the closure 1, is arranged radially outside the base element 4. In FIGS. 8A-D, the ring-shaped rotary element 5 is arranged in the internal space of the container 2 and within the base element 4, which is operatively connected to an external operating element 28. The rotary element 5 is rigidly connected to the operating element 28 through the openings 26 by means of webs 30. The webs 30 rotate in the same way as the operating element 28 when the latter is rotated.

In both embodiments, a plurality of cords 29 are arranged radially outside the sleeve 27 in the direction of the longitudinal axis between the edges 37. The cords 29 each have two ends 7, 8. The first end is attached to the base element 4 and the second end is attached to the rotary element 5. I.e, the cords are operatively connected to the rotary element 5 in such a way that by adjusting the rotary element 5 the second end 8 is moved in relation to the first end 7. As a result, the sleeve 27 is elastically constricted radially in the direction of the longitudinal axis 3 and finally pinched shut. The filling space 24 is thus closed in a liquid-tight manner. In these embodiments, three cords 29 are arranged. In the open state, the first and the second ends 7, 8 of each cord 29 preferably span an angle α of approximately 90-120° about the longitudinal axis 3, this angle α becoming greater when the rotary element 5 is rotated. In the fully open state, the sleeve 27 presses the cords 29 arranged on its outside outward by means of its tensioning force. Since the cords 29 are then not tensioned, they allow this. When the operating element 28 is rotated, the rotary element 5 in these examples moves clockwise, although the other direction is, of course, also possible, given an appropriate construction. The further the rotary element 5 is rotated, the greater the angle α that spans each cord 29 about the longitudinal axis 3, with the result that the cords 29 press the sleeve 27 toward the longitudinal axis 3, while the tensioning force of the sleeve 27 constantly counteracts this. Therefore, the closure 1 is not yet closed when the first end 7 and the second end 8 of each cord 29 are opposite one another in the container 2. Only when the angle α is greater than 180°, approximately 200-220°, is the sleeve 27 clamped by the cords 29 in the region of the longitudinal axis 3 in such a way that no more droplets can escape from the filling space 24 (see FIG. 7B and FIG. 8B). The angle of rotation 36 which a user executes by means of the rotation is in this case approximately 80-115°. In these embodiments, the openings 26 are therefore designed as three long, arcuate slots of approximately 110° to the longitudinal axis, thus enabling the webs 30 to be moved within the slots. Connecting regions 31 on the wall 22 or the base element 4 respectively, between the openings 26, rigidly connect the upper region of the container 2, which includes a mouthpiece 15, to the remaining region of the container 2, which includes the bottom 23.

Figure 9A:
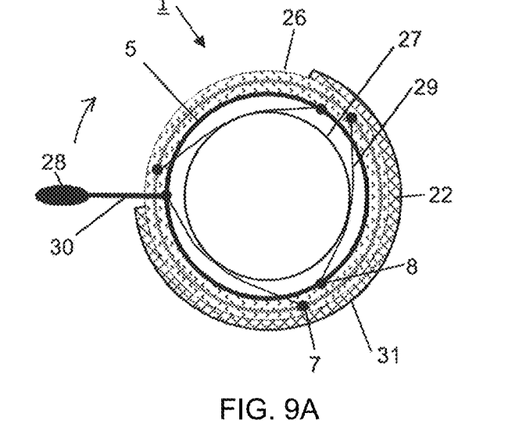
FIGS. 9A-B show a fifth variant of a closure according to the disclosure with a container.
Figure 9B:
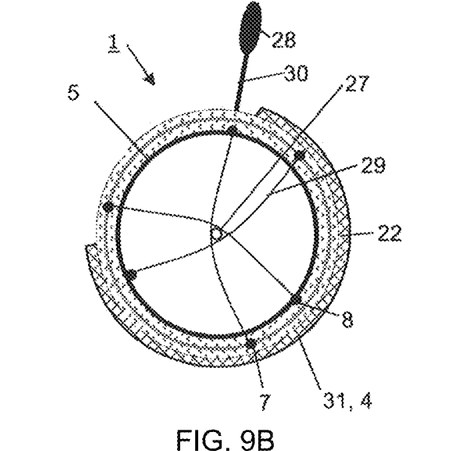
Figure 10A:
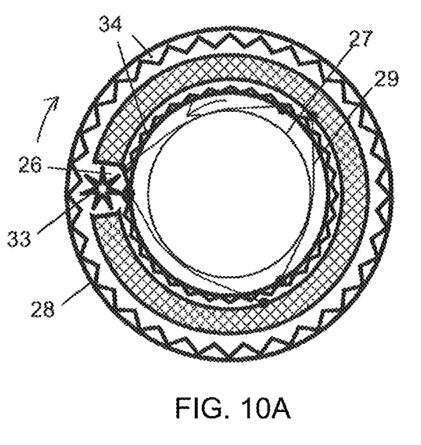
FIGS. 10A-D show a sixth variant of a closure according to the disclosure with a container.
Figure 10B:
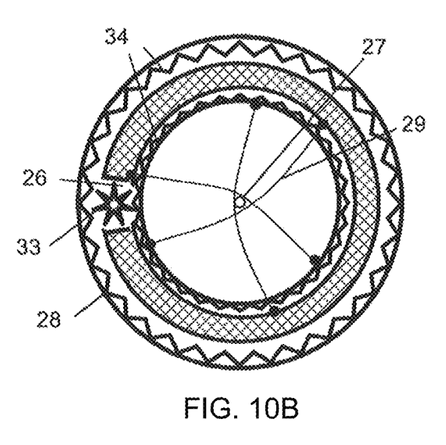
Figure 10C:
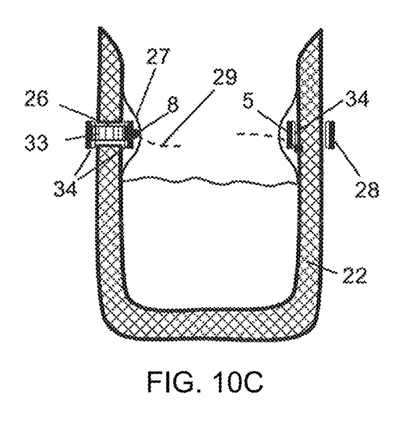
Figure 10D:
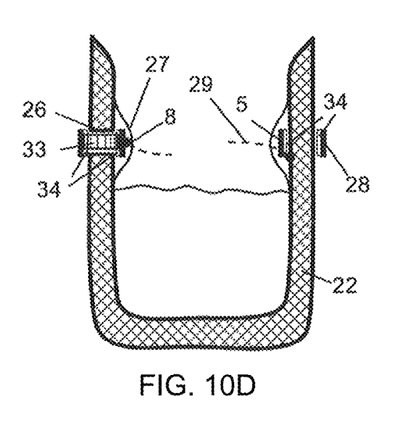

FIGS. 9A-B show another embodiment of a closure 1 on a container 2. In this embodiment, an operating element 28 is operatively connected to the rotary element 5 in the internal space 25 only through a single opening 26 by a web 30. This opening 26 spans an angle α of, for example, approximately 100-120° to the longitudinal axis 3. The arrangement of the cords 29 and the fastening of their ends 7, 8 correspond to those of FIGS. 8A-D. However, since only one opening 26 is provided here, sealing with respect to the outside is simpler. The rotary element 5 is preferably guided in a circumferential groove 32 in the base element 4 in order to maintain its axial position at all times.

In the embodiment according to FIGS. 10A-D, there is likewise only one opening 26. This does not have to be slot-shaped, but is smaller in comparison with the embodiments illustrated hitherto. The operating element 28 is ring-shaped and is operatively connected to the inner rotary element 5. A toothed wheel 33 is arranged in the opening 26, and toothing 34 is attached to the ring-shaped operating element 28 and the rotary element 5, which toothing engages in the toothed wheel 33, with the result that rotation of the ring-shaped operating element 28 inevitably leads to a counter-rotation of the rotary element 5. In this embodiment, the rotary element 5 and/or the annular operating element 28 can be guided in a groove 32 in the wall 22 or in the base element 4. The advantage of this arrangement is that the single opening 26 is smaller than in the other embodiments. In addition, the rotation of the rotary element 5 can be carried out for as long as desired, more than 360° if necessary.

Figure 11A:
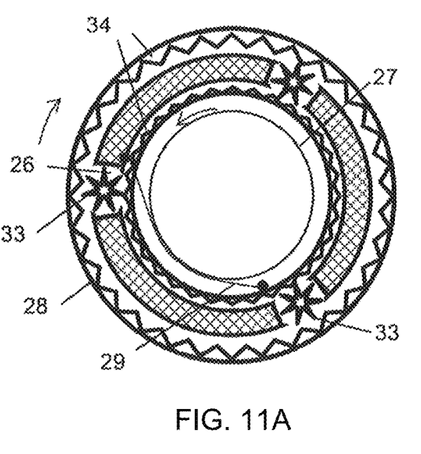
FIGS. 11A-B show a seventh variant of a closure according to the disclosure with a container.
Figure 11B:
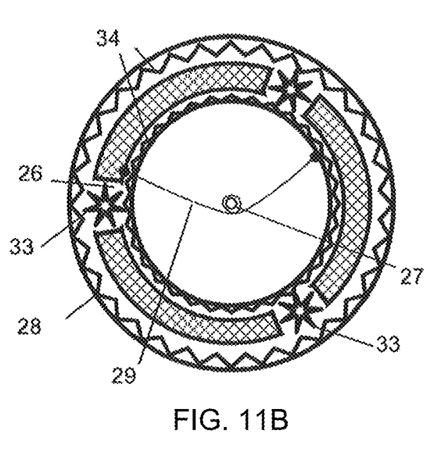
Figure 12A:
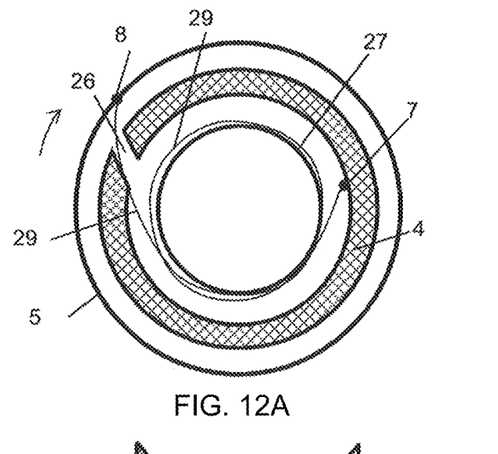
FIGS. 12A-D show an eighth variant of a closure according to the disclosure with a container.
Figure 12B:
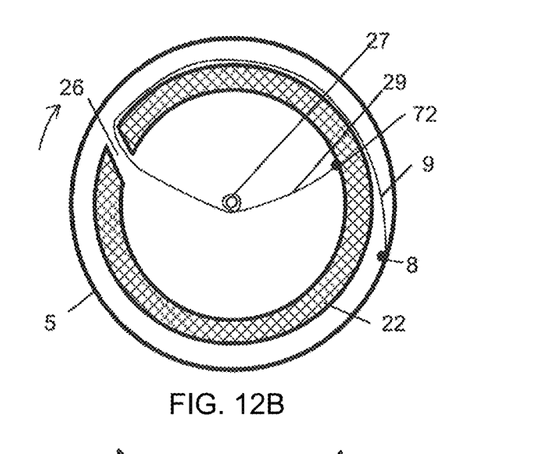
Figure 12C:
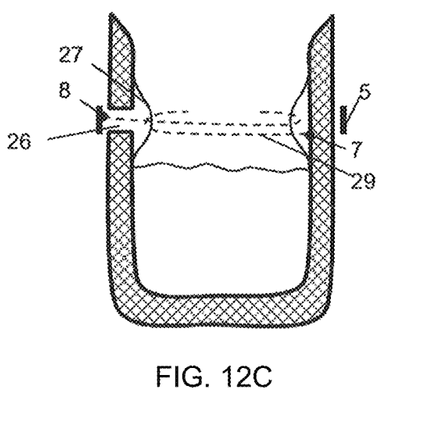
Figure 12D:
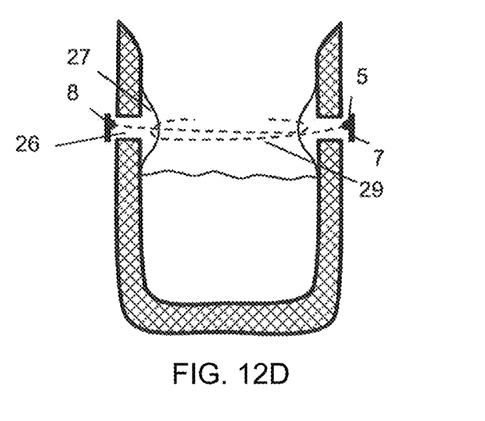

FIGS. 11A-B show the same example with three toothed wheels 33 in three openings 26. In both examples according to FIGS. 10A-D and FIGS. 11A-B, three cords 29 can be attached to the rotary element 5, as illustrated in FIGS. 10A-D, or only one, as illustrated in FIGS. 11A-B. In this case, the angle of rotation 36 must be selected correspondingly greater to ensure that the cord spans an angle α about the longitudinal axis 3 of approximately 500-540° when the container 2 is closed in a liquid-tight manner. It is also possible to arrange two cords 29, resulting in better symmetry when the container 2 is worn.

In the exemplary embodiment according to FIGS. 12A-D the rotary element 5 is of ring-shaped configuration and is held in an external groove in the wall 22 or in the base element 4. This exemplary embodiment has comparatively small openings 26 (through which no webs 30 extend and in which no toothed wheels 33 are arranged). A cord 29 extends through the at least one opening 26, which transmits the action of the rotary element 5 to the internal space 10. For this purpose, a first end 7 of the at least one cord 29 is in each case attached directly to the base element 4, specifically to the wall 22 opposite the opening 26, the cord 29 thereby winding around the sleeve 27 one and a half times. The second end 8 of the single cord 29 is attached to the rotary element 5. When the rotary element 5 is rotated, the cord 29 constricts and elastically squeezes the sleeve 27 toward the longitudinal axis 3. In this example, therefore, only exactly one opening 26 and one cord 29 are provided. The opening 26 only has to be of a size such that the cord 29 can be passed through it.

In all the embodiments illustrated in FIG. 7A-FIG. 12D, the number of cords 29 can vary. Depending on the application, an additional locking device 35 can be provided in all embodiments for locking the operating element and/or the rotary element in the closed position, as shown schematically, for example, in FIG. 7D. However, the embodiments can likewise be closable in a self-inhibiting manner, as described above. Furthermore, in all embodiments, the openings can likewise be formed obliquely in the direction of the longitudinal axis, so that, as a result of the rotation of the rotary element, the rotary element can be displaced in the direction of the longitudinal axis with respect to the base element. The openings or the elements extending through the openings can thus serve as first and second guide means, as described above.

The invention claimed is:

1. A closure for a container, comprising:
   a. a ring-shaped base element extending around a longitudinal axis and having a first through opening,
   b. a ring-shaped rotary element with a second through opening, the ring-shaped rotary element being operatively connected to the base element and rotatable relative to the base element about the longitudinal axis, wherein the rotary element is displaceable relative to the base element in the direction of the longitudinal axis, and
   c. at least one closing element having a first end and a second end, wherein
      i. the at least one closing element is operatively connected at the first end to the base element and at the second end to the rotary element, and wherein
      ii. a closure opening defined by the at least one closing element is radially constrictable by a displacement of the second end in relation to the first end, and wherein
      iii. a movable region of the at least one closing element defined by the first end and the second end of the at least one closing element, is arranged inside the first and/or the second through opening; and
   d. at least one ventilation channel for pressure equalization in a membrane interspace.

2. The closure according to claim 1, wherein the rotary element is held in a self-inhibiting manner against the base element in a closed state of the closure opening.

3. The closure according to claim 1, wherein the rotary element comprises a first guide means and/or the base element comprises a second guide means for guiding the rotary element in the direction of the longitudinal axis.

4. The closure according to claim 3, wherein the closure comprises at least one stop for the second guide means in the direction of the longitudinal axis.

5. The closure according to claim 4, wherein the second guide means is clampable to the at least one stop.

6. The closure according to claim 3, wherein the first and/or the second guide means are interrupted over the circumference by the at least one ventilation channel.

7. The closure according to claim 1, wherein the at least one closing element is a membrane which is twistable by the rotary movement of the rotary element.

8. The closure according to claim 7, wherein in a closed state of the closure opening, the rotary element is rotated by at least 180° relative to the base element.

9. The closure according to claim 7, wherein the membrane has an anti-adhesion coating on at least one side.

10. The closure according to claim 7, wherein the membrane is connected to the base element and/or the rotary element in a force-locking and/or form-fitting manner.

11. The closure according to claim 10, wherein at least one pressing ring is provided for fixing the membrane.

12. The closure according to claim 7, wherein the membrane is held pretensioned in the direction of the longitudinal axis in an open state of the closure.

13. The closure according to claim 1, wherein the closure includes a mouthpiece which is operatively connected to the rotary element or to the base element.

14. A container comprising the closure as recited in claim 1.

15. The container according to claim 14, wherein the base element is integrally connected to the container.

16. A closure for a container, comprising:
   a. a ring-shaped base element extending around a longitudinal axis and having a first through opening,
   b. a ring-shaped rotary element with a second through opening, the ring-shaped rotary element being operatively connected to the base element and rotatable relative to the base element about the longitudinal axis, wherein the rotary element comprises a first guide means and/or the base element comprises a second guide means for guiding the rotary element in the direction of the longitudinal axis, wherein the first and/or the second guide means are interrupted over the circumference by at least one ventilation channel, and
   c. at least one closing element having a first end and a second end, wherein
      i. the at least one closing element is operatively connected at the first end to the base element and at the second end to the rotary element, and wherein
      ii. a closure opening defined by the at least one closing element is radially constrictable by a displacement of the second end in relation to the first end, and wherein
      iii. a movable region of the at least one closing element defined by the first end and the second end of the at least one closing element, is arranged inside the first and/or the second through opening.

* * * * *